United States Patent [19]

Frejborg

[11] Patent Number: 4,836,915
[45] Date of Patent: * Jun. 6, 1989

[54] HIGH FLOW CAPACITY BARRIER TYPE SCREENING APPARATUS

[75] Inventor: Frey Frejborg, Glens Falls, N.Y.

[73] Assignee: A. Ahlstrom Corporation, Noormarkku, Finland

[ * ] Notice: The portion of the term of this patent subsequent to Jun. 30, 2004 has been disclaimed.

[21] Appl. No.: 67,635

[22] Filed: Jun. 26, 1987

Related U.S. Application Data

[63] Continuation-in-part of Ser. No. 738,743, May 29, 1985, Pat. No. 4,676,903, which is a continuation-in-part of Ser. No. 472,742; Mar. 7, 1983, Pat. No. 4,529,520.

[30] Foreign Application Priority Data

Jan. 26, 1983 [FI] Finland ................................. 830256

[51] Int. Cl.⁴ ......................... B01D 29/38; B07B 1/20
[52] U.S. Cl. .................................... 209/273; 209/397; 210/413
[58] Field of Search ................... 162/55; 209/273, 250, 209/300, 305, 306, 379, 397; 210/413, 498

[56] References Cited

U.S. PATENT DOCUMENTS

3,363,759  1/1968  Clarke-Pounder ................. 209/273
4,447,320  5/1984  Lamort .............................. 209/273

Primary Examiner—Ivars Cintins
Attorney, Agent, or Firm—Bucknam and Archer

[57] ABSTRACT

An apparatus for screening paper stock comprises a vessel, a cylindrical screen cylinder within the vessel, a rotating element moving in the vicinity of the screen cylinder at a predetermined speed, an inlet for unscreened stock, an outlet for the screened stock, and an outlet for the stock fibers and unwanted rejectable material which does not pass through the screen cylinder. The rotating element has a contour surface with grooves formed of a first bottom plane parallel the envelope surface, an inclined plane, an upper plane, and a side plane, the side plane being essentially perpendicular to the first plane, the inclined plane forming an angle between 5°-60° with the first plane, the upper plane being parallel to the first plane. The rotor element may be either a rotor or blade type segments. Also the screen cylinder has a contour surface. The inclined plane of the contour surface of the rotor may be the upstream or the downstream side plane. The method is also described. The invention is particularly useful in the screening of the stock flowing to the headbox of a paper making machine.

19 Claims, 6 Drawing Sheets

HIGH FLOW CAPACITY BARRIER TYPE SCREENING APPARATUS

The present application is a continuation-in-part of U.S. Ser. No. 738,743 filed May 29, 1985, which is a Continuation-in-Part of Ser. No. 472,742 filed Mar. 7, 1983. The latter has now issued as U.S. Pat. No. 4,529,520 on July 16, 1985. The subject matter of U.S. Ser. Nos. 472,742 and 738,743 is incorporated herein by reference U.S. Ser. No. 738,743 has issued as U.S. Pat. No. 4,676,903 on June 30, 1987.

Known screening apparatus particularly in the case of paper making machines comprises a cylindrical screen within a vessel having an inlet for unscreened pulp, an outlet for screened pulp, i.e., the accept and one outlet for the reject. In the vicinity of the screen there is arranged a rotating element with foils which serves the purpose of creating negative pulses, inducing backflow and preventing plugging of the screen.

It has been found, however, that very little flow through the screen cylinder is induced by any positive pulses produced by the foils in comparison with the difference in pressure across the screen plate between the inlet and the outlet of the screen. The typical frequency of a foil type rotor is about 25 Hz or 1500 pulses per minute.

The present invention relates to a screening apparatus which is primarily intended to overcome the drawbacks of low hydraulic capacities at high pressure drops when screening paper stocks with fine or small perforations. This screening apparatus comprises a vessel, a cylindrical screen cylinder in the interior of the vessel, a rotor which moves in the vicinity of the screen surface, an inlet for the stock to be screened, an outlet for the reject and another outlet for the screened stock, which is called the accept.

More specifically, the present invention relates to a screening apparatus primarily for screening stock flows of consistency 0.3%–3.0% just ahead of headboxes on paper machines where the stocks have low consistency, which require high flow capacity at low pressure drop across the screen. The apertures or orifices within the screen cylinder must be fine enough to protect the slice opening in the headbox and must also remove unwanted rejectable material in the stock flow which could affect the quality of the paper produced. Particularly in the case of dilute stock suspensions, it is desirable to increase the flow capacity and to operate with low pressure drop, because improved stability in operating conditions with lower pumping requirements is achieved.

The crux of the present invention resides in the combination of a high frequency pulsating rotor and a screen with a contoured surface so that large positive pulses are followed by negative pulses. The large positive pulses force the pulp suspension through the contoured screen cylinder which is provided with positive pressure inducing means located just downstream of the apertures of the screen. According to one embodiment, the screen plate has grooves, the grooves having a contour surface and the rotor or blade segments also has a contour surface. An essential feature of the inventions when the screen plate has grooves, is that the grooves of the screen plate have a bottom plane, an upper plane, a side plane essentially perpendicular to the bottom plane and an inclined plane. Further, the perforations are located in the bottom plane of the grooves and a high positive pulse is created in the location in the proximity of the perforations because of the flow of the liquid suspension over the contour surface of both rotor and screen plate.

Another essential feature of the screen plate according to the invention is that the inclined plane of the grooves is the upstream side of the grooves and the other, the perpendicular plane, the downstream side of the grooves. It has been found that by directing the flow in relation to the screen plate in this manner, the pressure at the screen perforations is much higher than the pressure obtained by directing the flow in the opposite direction. With the higher pressure, a much greater flow velocity through the perforations of the screen plate is achieved, thus resulting in superior capacity.

The apparatus according to the present invention is a high frequency pulsating rotor and screen plate which increases the hydraulic flow capacity through the screen at reduced pressure drop. This is accomplished by designing a rotor and screen plate which both produce high frequency positive pulses within the screening zone just ahead of the perforations, holes or slots, within the screen cylinder. The higher pressure at the entrance of the perforations increases the flow through the apertures. Higher flow through the perforations is obtained due to the increase in $\Delta P$ across the perforations even though $\Delta P$ across the screen may be lower than conventional screens.

According to another embodiment of the invention, the screen plate, instead of grooves, has bars on the downstream side ahead of the perforations for inducing positive pulses. Also the contour surface of the rotor could be produced of means of bars.

Figure 1:
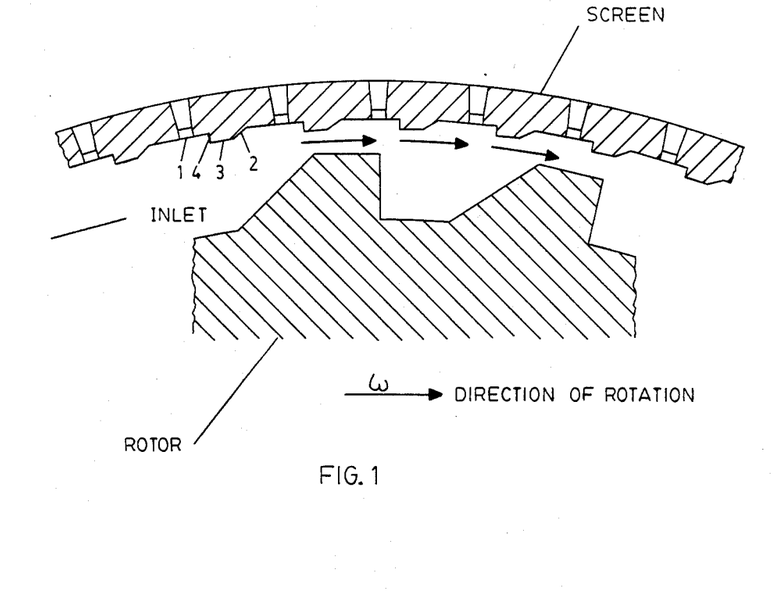
FIG. 1 illustrates a rotor and a screen according to one embodiment of the present invention.
Figure 5:
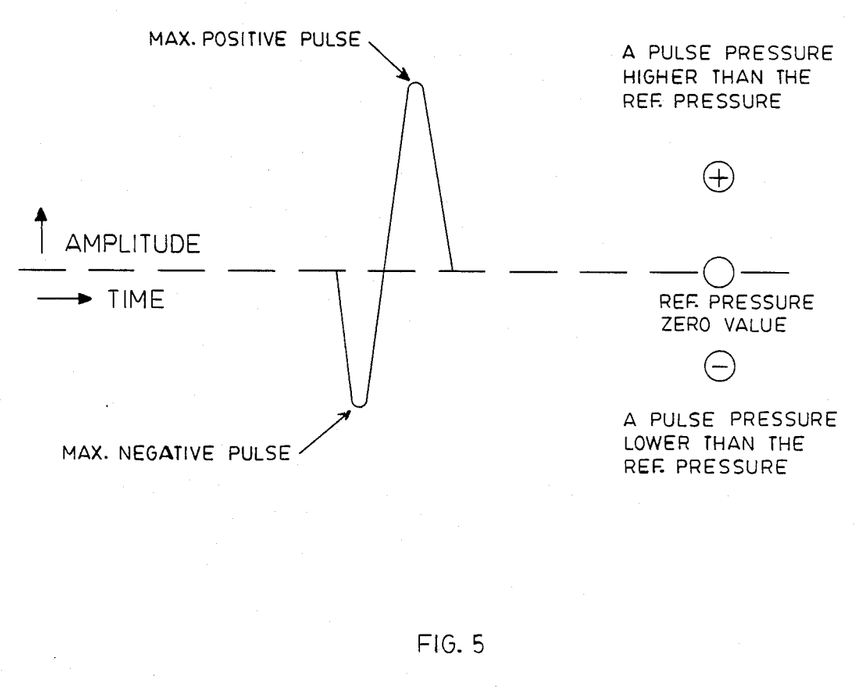

As shown in FIGS. 1 and 5, the cylindrical screen plate has an inlet I on one end for introducing the unscreened stock, and an outlet (not shown) on the opposite end for removing the reject portion. Means are provided for moving the unscreened stock along one first direction of flow. The screen cylinder has grooves in the side of the inlet recessed in the screen surface, the first direction of flow being essentially transverse to the grooves. It should be noted that the direction of the grooves may be different from the axial direction of the screen, but preferably the direction of the grooves is essentially transverse to the flow direction of the circulating pulp. The grooves are formed of a bottom plane 1 essentially parallel to the envelope surface of the screen plate, an upstream inclined plane 2, a downstream side plane 4, essentially perpendicular to the bottom plane and an upper plane 3 parallel to the envelope surface of the screen plate. The terms "upstream" and "downstream" are used in reference to a point on the bottom plane. The width of the bottom plane of the grooves is at least as large as the diameter or width of the perforations and is at least 0.006 inch and up to 0.5 inch. The height of the side plane is 0.004–0.2 inch. The angle between the inclined plane and the bottom plane is between 5° and 60°.

Figures 9A, 9B:
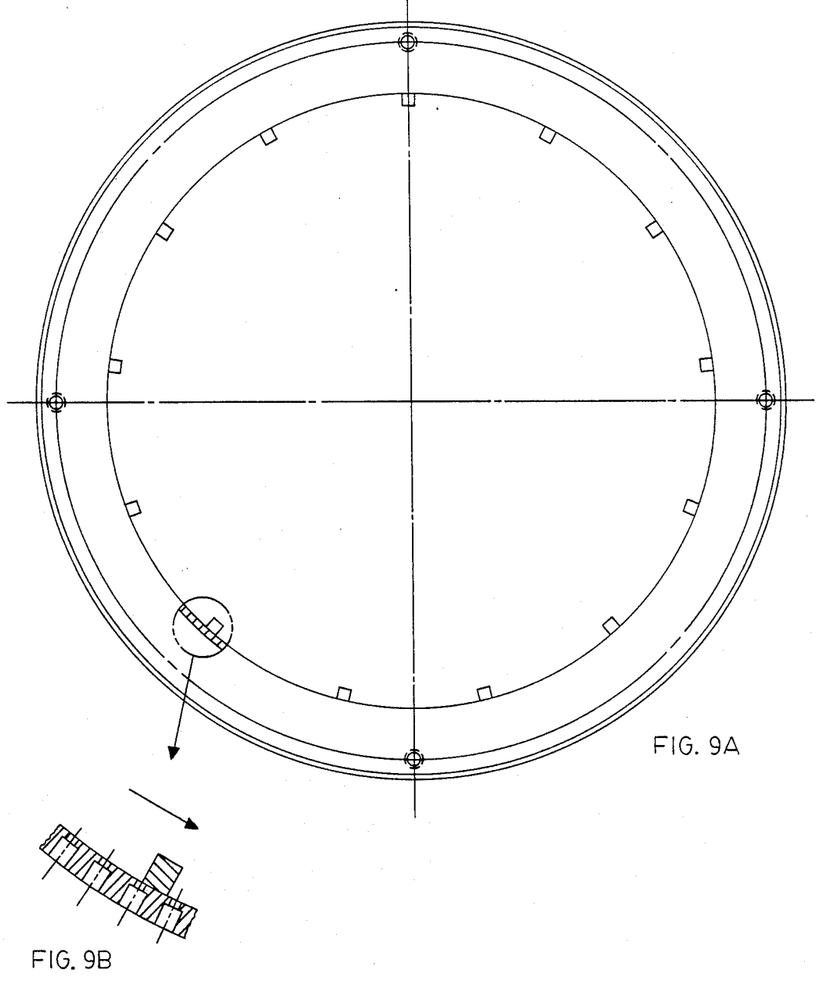
FIGS. 9A–9C illustrate the embodiment of the invention in which the screen cylinder has bars instead of grooves to induce positive pulses at the apertures.
Figure 9C:
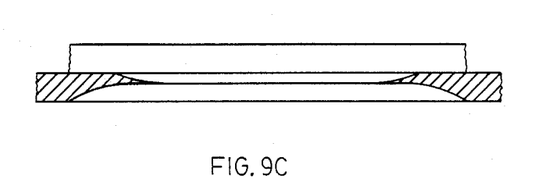

In the embodiment in which the screen plate has bars instead of grooves, the height of the bars is 0.04 inch–0.4 inch and the width is 0.1 inch–0.4 inch.

Figure 2:
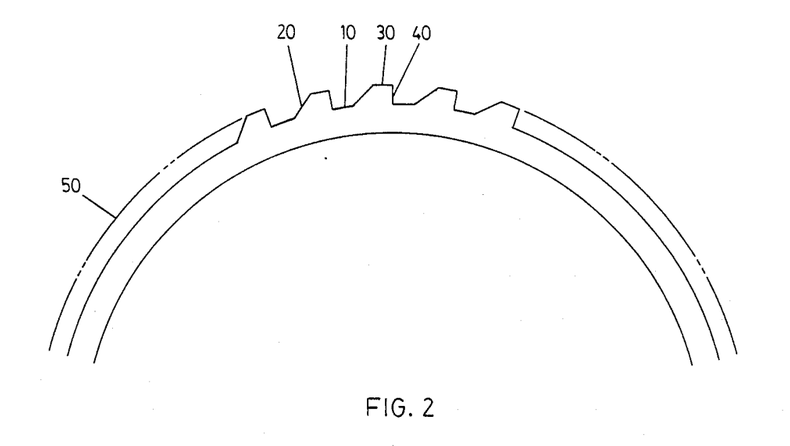
FIG. 2 illustrates the contour surface of the rotating element.
Figure 3:
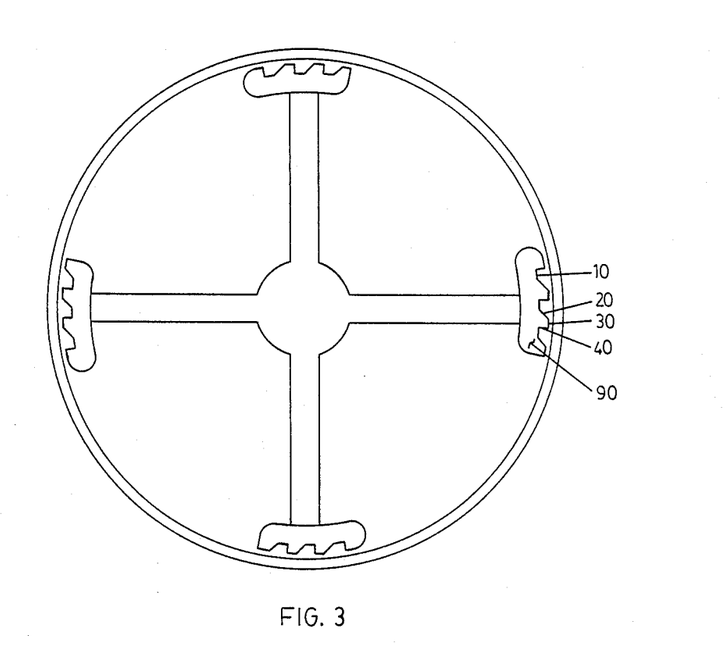
FIG. 3 illustrates the rotating element with blade type segments.
Figure 4:
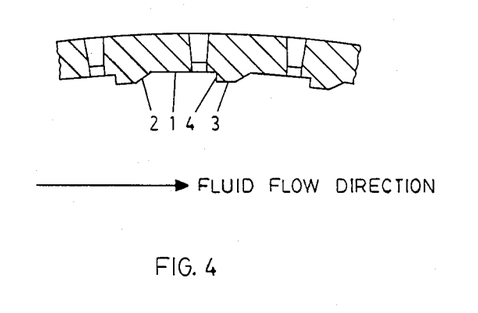
FIGS. 4 and 5 illustrate the positive and negative pulses obtained with a screen plate according to the invention.
Figure 6:
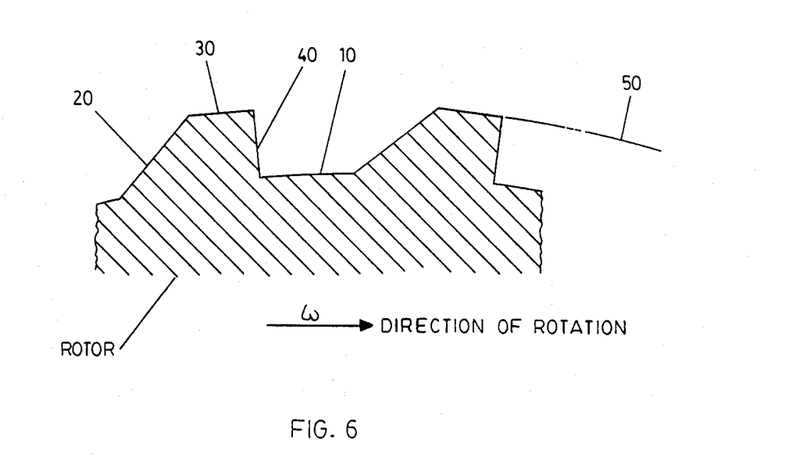
FIGS. 6 and 7 illustrate the pulse profile produced by a rotor with contour surface as shown.

Also the rotating element has a contour surface. As shown in FIGS. 2, 3, and 6, the contour surface is formed of a first bottom plane parallel to the envelope surface, an inclined plane, an upper plane and a side plane, the side plane being substantially perpendicular to the first plane and the inclined plane of the grooves forming a 5°–60° angle against the first plane, the upper plane being parallel to the first plane. According to a preferred embodiment this angle is about 45°.

Although one contour surface is shown, many different shapes of contour surfaces may be used, as long as high frequency positive pulses are produced to generate pressure above the screen apertures followed by high negative pulses to backflush the apertures within the screen cylinder. For instance the leading surface of the rotor may be the inclined plane or the side plane essentially perpendicular to the bottom plane. The leading surface could also be curved.

By reference to FIGS. 2, 3, and 6, numeral 10 designates the first plane and numeral 20 designates the inclined plane. Numeral 30 designates the upper plane and numeral 40 designates the side plane essentially perpendicular to the first plane. The envelope surface which is a surface going through the peaks of the protrusions of the rotor surface, is designated by numeral 50.

The width of the bottom plane is 0.125 inch–3 inches. The height of the side plane is 0.06 inch–2 inches. The angle between the inclined plane and the bottom plane is 5°–60°. The length of the upper plane is 0.125–3 inches.

Figure 7:
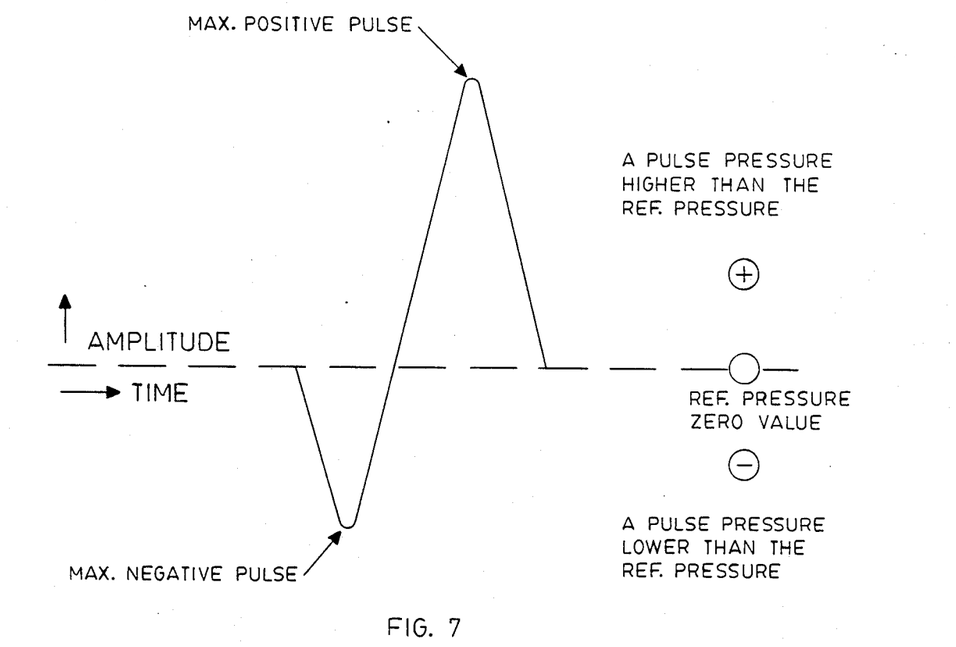

To understand why the screening apparatus according to the present invention exhibits superior performance, the pulses produced by the fluid flow over the contour surface of the screen cylinder and the pulses produced by the rotating elements, either a rotor or blade type segment must be considered. As shown in FIGS. 5 and 7, a maximum negative pulse is induced right after the start of the inclined plane of the contour surface within the screen plate. The inclined surface acts like a foil blade under a moving fourdrinier wire on a paper machine creating a negative pulse. This may also be explained by the fact that a negative pulse is induced at this surface because the inclined plane is diverging and the fluid wants to flow causing a negative pulse.

After a maximum negative pulse is reached, the pulse pressure starts to increase again, reaching a maximum positive value just ahead of the side plane 4 within the contour surface of the screen. One way to visualize why a positive pulse in induced at this surface is to put one hand into a fast moving stream against the flow at a right angle to the direction of the flow. A positive head will develop right ahead of the hand.

FIG. 7 shows the pulse produced by a rotating element with a contour surface as described. As shown in FIG. 7, a large positive pulse is produced by the rotating side plane surface 40 which is at a right angle to the direction of flow within the screening zone. This surface acts like a pumping vane, creating a pressure wave just ahead of it as it moves through the stock flow. After a maximum positive pulse is reached at the side plane surface, the pulse pressure starts to decrease to a maximum negative value just after the start of the contour inclined plane surface 20 on the rotor.

FIGS. 5 and 7 on the pulse profiles produced by the contour surfaces in the screen cylinder and rotor respectively, explain the reason for the superior performance achieved with respect to other screening apparatuses which operate with a conventional screen plate without a contour surface and a hydrofoil type rotor. The superior performance consists of higher flow capacity through the orifices or apertures within the screen cylinder at lower overall pressure drop across the screen. The high capacity results from the combination of the positive pulses produced from both the screen cylinder and rotor. As shown in FIG. 5, the maximum positive pulses induced by the contour grooves in the screen cylinder occur right at the orifices or apertures in the bottom plane 1 of the grooves just ahead of the side plane 4 within the contour grooves.

Figure 8:
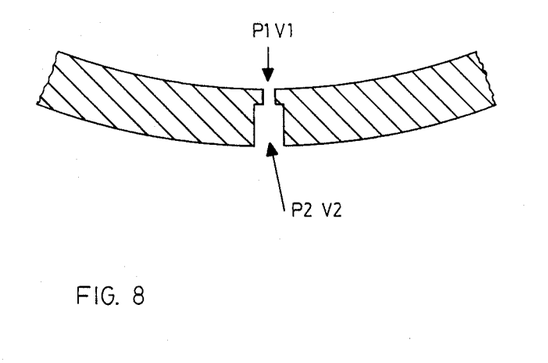
FIG. 8 illustrates the flow through a single orifice.

In addition to the positive pulses induced by the screen cylinder, large positive pulses are produced by the rotating element as shown in FIG. 7. The combination of these positive pulses greatly increases the fluid flow through the orifices within the screen. Since the general orifice flow equation is $F = KA\sqrt{\Delta P}$, it is clear that the greater the pressure drop across the orifice, the higher the fluid flow through the orifice. In the equation, $F$ = the fluid flow = $A \times V$ (area × velocity)
$V = K\sqrt{\Delta P}$
$A$ = area of orifice
$K$ is a constant depending upon the nozzle coefficient, units of measurements, and fluid conditions (consistency, temp, viscosity, etc.)
$\Delta P$ = the pressure drop across the orifice It should be stressed that $\Delta P$ across an orifice is not the $\Delta P$ across the screen. The $\Delta P$ across the orifices within the screen are very local and change very rapidly with time, but the $\Delta P$ across the screen is the difference in the average pressure between the inlet and outlet connections on the screen. Within the scope of this application, a low pressure drop across the screen is produced. The equation above $F = KA\sqrt{\Delta P}$ is derived from the general energy equation where it is assumed that the inlet radial velocity component is relatively small in comparison with the velocity of the stock flow through the orifice, as shown in FIG. 8.

EXAMPLE

The screening apparatus according to FIG. 1 of the present invention has been tested on headbox consistency stock of 0.25%. The contour grooves in the rotor had the following dimensions: width of bottom plane: $\frac{5}{8}''$; width of upper plane: $\frac{1}{4}''$; height of side plane: $\frac{1}{4}''$; angle of inclined plane to bottom plane: 30°; the minimum rotor clearance between screen and rotor was 0.200 inch.

The contour screen cylinder in the experiment had the following dimensions: width of apertures in the screen: 0.020" (slots); length of axial aperture dimension: 1.04 inch (slot); depth of grooves: 0.27"; angle of the inclined plane to the bottom plane: 30°.

Comparative tests were run on the above combination in configuration as shown in FIG. 1 to compare results with the apparatus according to the present invention and a conventional apparatus. The pressure difference across the screen, consistency, slot size, number of slots and also the slot area were the same in both apparatuses. The table shows the differences between the apparatuses.

|  | INVENTION | STANDARD |
|---|---|---|
| Flow of the screen (GPM)* | 872 | 190 |
| ΔP Across Screen in ΔPSI | 1.5 | 1.5 |
| % Consistency | 0.25% | 0.25% |
| Approx. rotor or foil speed | 872 | 400 |
| Approx. Pulses/Sec. (Hz) | 1200 | 25 |
| Slot Size | 0.020" | 0.020" |
| Number of slots | 585 | 585 |
| Flow through a slot | 1.49 | .324 |
| Slot area Ft² .020 × 1.04 | .000144 | .000144 |
| Flow speed through the perforations (ft per second) | 23 | 5 |
| Pressure difference across the slot (PSI) | 9.87 | 0.47 |
| Acceleration through an orifice | 1700 G's** | 7.8 G's** |
| Average time of positive pulses in seconds | 0.000417 | 0.02 |

*Gallons per minute
**G's is the acceleration divided by gravity

As the table above shows the screen according to the invention is superior to the standard screens. The flow through the screen is 4.5 times the flow achieved by the standard screen at the same pressure drop across the screen. The pressure difference across the slot is 20 times the pressure difference with the standard screen.

The benefits of higher G forces on the fibers passing through the fine orifices within a screen cylinder are as follows:
A. The forces not only move more fibers but also a greater % of the longer fibers through the screen; higher capacity is achieved.
B. Less fractionation of the longer fibers to the rejects.
C. Less dewatering or concentration of the fibers in the rejects.

The rotor an screen according to the present invention permit to achieve the same capacity with finer perforations and better screening at same or lower pressure drop as with conventional apparatuses.

Another advantage of the present invention over conventional screening apparatuses commonly used for screening ahead of headboxes on paper machines is that they mostly use foil type elements which produce pulses in the range of 20 Hz. The apparatus according to the present invention produces pulses in the range of 200 Hz, an order of magnitude higher than a conventional headbox screen. Higher frequency, lower magnitude pulses are much more desirable in headbox screening than lower frequency, higher magnitude because higher magnitude pulses may cause variations in the quality of the paper produced.

According to one embodiment of the invention the rotor may be operated with the inclined surface as the leading edge and the perpendicular side plane as the trailing surface or edge. In this manner, the inclined surface produces a positive pulse, but of lower magnitude than the right angle side plane surface and forces less fibers through the screen, a fact which improves its screening efficiency. The perpendicular side plane also produces a much higher negative pulse which helps in backflushing the apertures within the screen, keeping them from plugging.

In accordance with another embodiment in which the leading edge of the rotor surface is at a right angle to the direction of flow, the height or depth of the leading edge may be changed to increase or decrease the positive pulse being produced. Also the angle of the trailing inclined surface may be changed to produce a higher or lower negative pulse which effects the backflushing of the apertures within the screen plate. The greater the negative pulse, the greater will be the backflushing through the apertures.

Still another advantage of the apparatus and method according to the present invention is the dampening of low frequency high magnitude pulsations coming to the screen.

What is claimed is:

1. An apparatus for screening pulp of low consistency which comprises a vessel having an inlet for the unscreened pulp, a first outlet for the accept, a second outlet for the reject, a screen cylinder within the vessel, said inlet and said outlets being in operative communication with said screen cylinder, a rotating element moving in the vicinity of said screen cylinder at a predetermined speed, said screen cylinder being formed of a screen plate having a contoured surface, said rotating element having a contour surface which faces the contour surface of said screen plate, the space between said screen cylinder and said rotating element define there between a screening zone, said inlet introducing said unscreened pulp in said screening zone between said contoured surface of said screen plate and said rotating element, said contoured surface of said screen plate having a bottom plane and apertures within said bottom plane, said contoured surfaces of said screen plate and said rotating element providing positive pressure inducing means causing positive pressure pulses towards the inlet of said apertures of said screen plate, whereby said positive pressure pulses force the accept through said screen plate.

2. The apparatus according to claim 1 wherein said screen plate has an envelope surface, said screen plate has grooves being formed of an upstream inclined side plane, as seen standing from the bottom of the grooves, a downstream side plane, an upper plane and a bottom plane, the grooves having apertures in the bottom plane, said bottom plane being substantially parallel to the envelope surface of said screen plate, said upstream inclined plane forming a 60–5 degree angle against said envelope surface and said downstream side plane being substantially perpendicular to said envelope.

3. The apparatus according to claim 1 wherein said positive pressure inducing means comprise bars located downstream of the apertures of the screen plate.

4. The apparatus according to claim 1 wherein said rotating element is a rotor.

5. The apparatus in accordance with claim 4 wherein said screen has a screen plate, said positive pressure inducing means are formed of two co-operating contoured surfaces, one of said contoured surfaces being the surface of the screen plate and the other being the surface of the rotor, both contoured surfaces being formed of a bottom plane, an upstream plane with respect to the bottom plane, an inclined side plane and a downstream side plane, said downstream side plane (4,40) of both said screen plate and said rotor being said positive pressure inducing means.

6. The apparatus according to claim 1 wherein said rotating element consists of blade type segments.

7. The apparatus according to claim 1 wherein said rotating element is a rotor and said contour surface of said rotor consists of grooves formed of a first bottom plane parallel to the envelope surface, an inclined plane, an upper plane and a side plane, said side plane being essentially perpendicular to said bottom plane, said inclined plane forming an angle between 5 and 60 degrees with said first bottom plane and wherein said screen plate has grooves in the side of the inlet recessed in the screen surface.

8. The apparatus according to claim 7 wherein the leading surface plane of the rotor is the side plane perpendicular to the bottom plane.

9. The apparatus according to claim 7 wherein the inclined plane of the rotor is the leading surface.

10. The method of screening a pulp suspension of low consistency at high capacity which consists of introducing said pulp suspension into an apparatus which comprises a vessel, a screen cylinder within the vessel, a rotating element moving in the vicinity of the screen plate at a predetermined speed, an inlet for the unscreened pulp, a first outlet for the accept screened pulp in said vessel, and a second outlet for the reject, said first and second outlets being in operative communication with said screen cylinder, said rotating element having a contour surface, wherein said screen cylinder has a screen plate, said screen plate has a contoured surface and apertures at the bottom thereof, said contour surfaces of said screen cylinder and said rotating element face each other and define a screening zone between them, said inlet introducing said unscreened pulp into said screening zone, the pulp flowing in an essentially circumferential path a high flow velocity, and the pulp is subjected to the combined positive pressure of the contoured screen cylinder and the contoured surface of the rotating element at the inlet of the apertures, whereby the positive pressure pulses force the accept through said apertures at high flow velocity and high capacity is achieved.

11. The method according to claim 10 which comprises subjecting said pulp suspension alternately to high frequency positive and negative pressure pulses, the positive pulses being created by the rotating element essentially at the apertures of the screen cylinder and directed towards said apertures whereby the pressure pulses force the suspension to flow at a high velocity through the apertures and then subjecting said suspension to negative pulses created by the rotating element essentially at the screen apertures and directed away from the apertures of the screen cylinder whereby fibers and debris stuck in said apertures are drawn off, the formation of a fiber mat on the surface of the screen cylinder is prevented whereby high capacity is maintained.

12. The method according to claim 11 wherein said pulp suspension is subjected to positive pressure pulses at the inlet of the apertures generated by the contour surface of the screen and the contour surface of said rotating element.

13. The method according to claim 10, wherein the average pressure drop across the screen apertures is higher than the pressure drop across the screen.

14. The method according to claim 13, wherein the local pressure drop across the screen aperture is higher than the pressure drop across the screening apparatus.

15. The method according to claim 10, wherein the frequency of the pressure pulses is more than 50 Hz.

16. The method according to claim 10, wherein the average pressure drop between the inlet and the outlet of the apertures of the screen is greater than 1.5 PSI.

17. The method according to claim 10, wherein the magnitude of the positive pulses is greater than the magnitude of the negative pulses.

18. The method according to claim 10, wherein the average flow velocity through the apertures of the screen is greater than 9 feet/second.

19. In an apparatus for screening of pulp of low consistency which comprises a vessel, a cylindrical screen plate within the vessel having an envelope surface, the screen plate having a contoured surface and apertures, a rotating element moving in the vicinity of the screen plate at a predetermined speed, an inlet for the unscreened pulp, a first outlet for the accept screened pulp in said vessel, a second outlet for the reject, said first and second outlets being in operative communication with said screen, the improvement which comprises a rotating element having a contour surface, said contour surface of said screen plate and said contour surface of said rotor facing each other and defining a screening zone, the inlet for said unscreened pulp being connected to said screening zone, said contour surface of said screen plate having positive pressure inducing means located just downstream from the apertures of the screen plate, wherein said positive pressure inducing means are bars located downstream of the apertures of the screen, said bars forming an upstream side plane, a downstream side plane, and an upper plane, said apertures being located in the plane between said bars, said plane being substantially parallel to the envelope surface of the screen plate, the upper plane being parallel to said plane between said bars, the downstream side plane being substantially perpendicular to the envelope surface.

* * * * *